March 15, 1949.　　　E. F. SAWALL　　　2,464,615
POWER LIFT FOR IMPLEMENTS

Filed Feb. 2, 1946　　　3 Sheets-Sheet 1

INVENTOR.
E. F. Sawall
BY
ATTYS

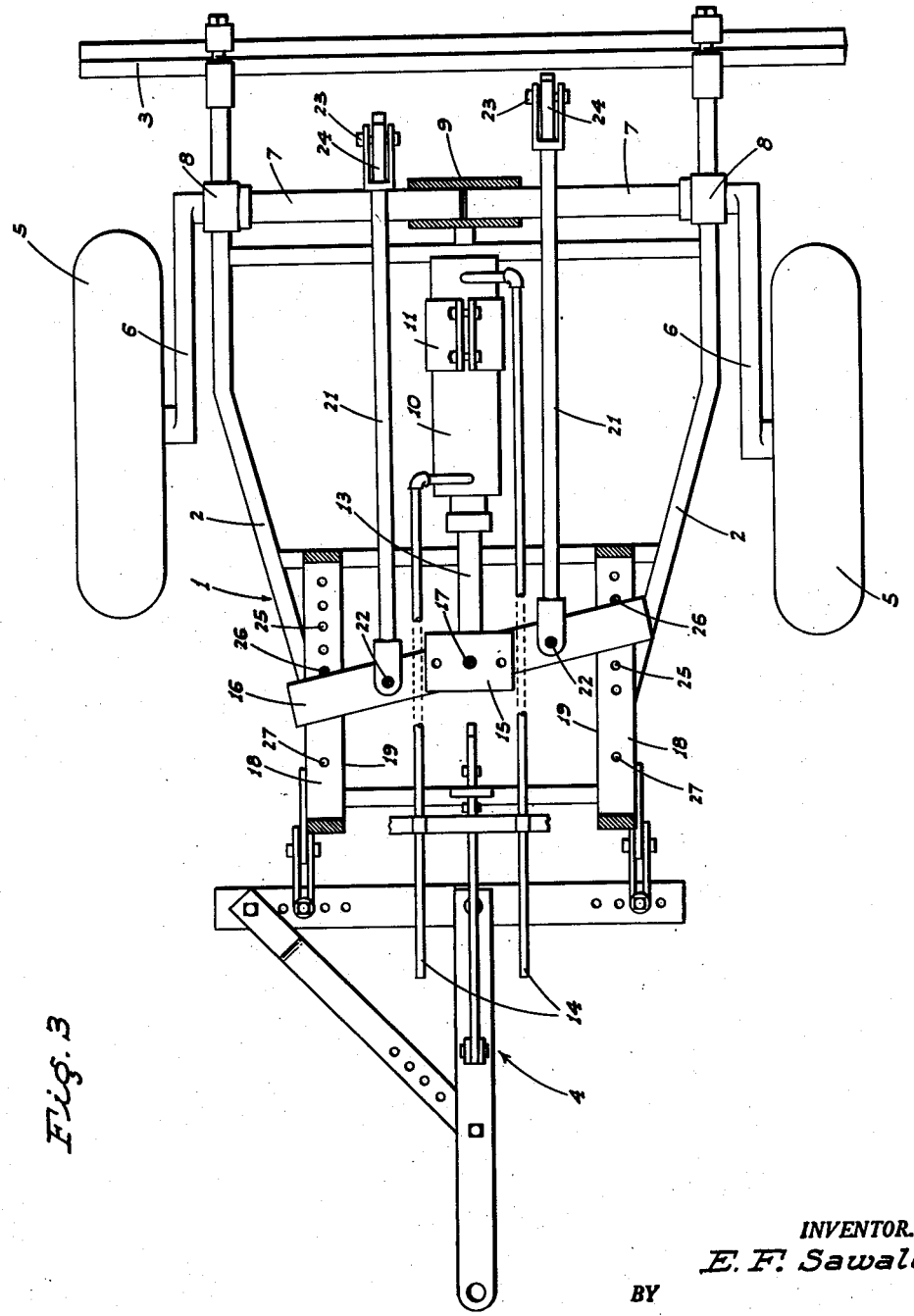

Patented Mar. 15, 1949

2,464,615

UNITED STATES PATENT OFFICE 2,464,615

POWER LIFT FOR IMPLEMENTS

Ervin F. Sawall, Kerman, Calif.

Application February 2, 1946, Serial No. 645,216

7 Claims. (Cl. 97—103)

The present invention is directed to, and it is an object to provide, an improved, wheel supported power lift for earth working tools or implements.

Another object of the invention is to provide a power lift, as above, which comprises a frame, adapted to carry an implement, supported above ground by a pair of transversely spaced wheels, the wheels being mounted for differential vertical adjustment, and power actuated means operative to relatively raise the wheels from a position in transverse alinement and the frame raised for transport, to a position with the wheels in vertically offset relation and the frame lowered to place the implement in ground working position. The advantage of such differential adjustment or offsetting of the wheels when the frame is lowered and the implement in working position, resides in the fact that the frame and implement can be maintained level when the lowermost wheel is running in a furrow, as is often the case.

An additional object of the invention is to provide a power lift, as in the preceding paragraph, wherein the extent of differential vertical adjustment can be regulated as working conditions may require.

A further object of the invention is to provide a power lift for implements, comprising a frame supported by a transversely spaced pair of wheels mounted on separate crank axles on the frame, a fluid pressure actuated power cylinder mounted on the frame, and novel operating connections between the cylinder and said crank axles arranged to cause differential and selectively variable vertical adjustment thereof.

A further object of the invention is to provide a practical power lift for implements, and one which will be exceedingly effective for the purpose for which it is designed.

These objects are accomplished by means of such structure and relative arrangement of parts as will fully appear by a perusal of the following specifications and claims.

In the drawings:

Fig. 3 is a similar view, but shows the position of the parts when the wheels are relatively raised to a position of differential adjustment in a vertical plane, with the frame in lowered working position.

Figure 1:
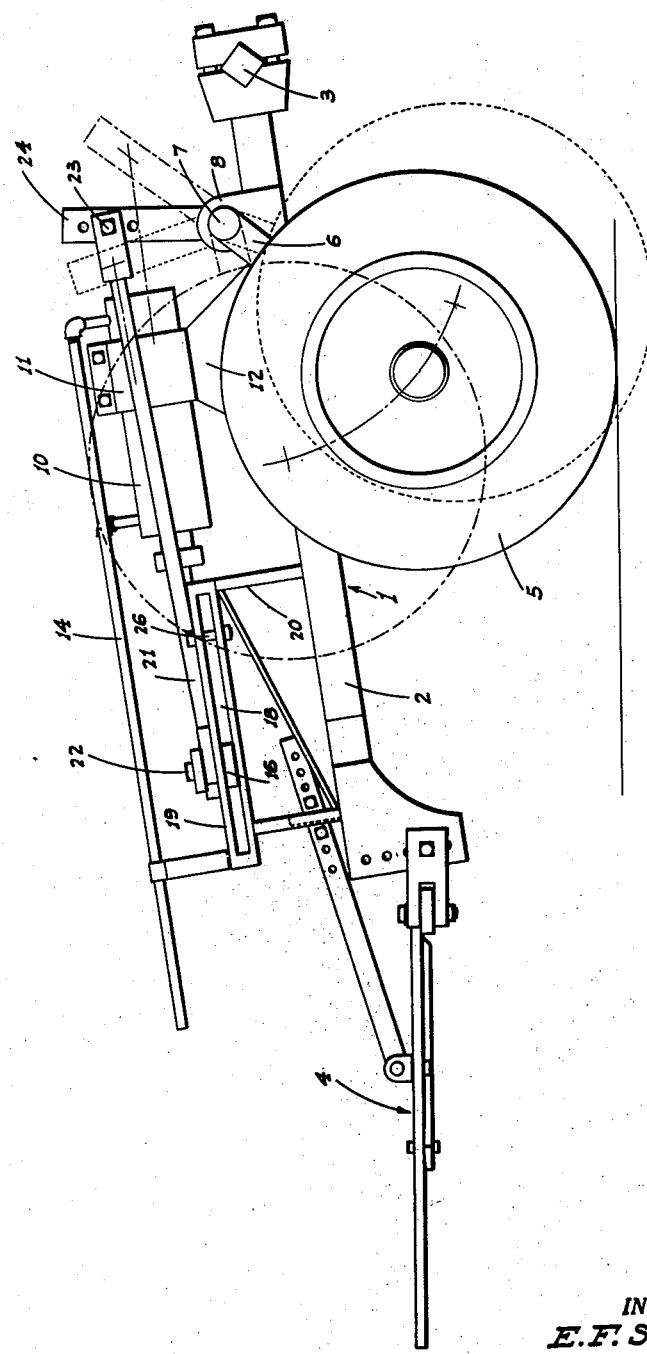
Fig. 1 is a side elevation of the improved power lift for implements; the upper and lowermost limits of movement of the wheels being shown in broken and dotted lines, respectively.

Referring now more particularly to the characters of reference on the drawings, the power lift comprises a rigid main frame 1 disposed above and for movement along the ground; said main frame including transversely spaced beams 2 which are secured, at their rear ends, to a transverse tool bar 3.

The ground working tools or implements (not shown) are fixed in connection with and depend from the tool bar for earth engagement. At the forward end the frame 1 is fitted with an adjustable, anti-jack-knifing drawbar unit, indicated at 4.

Intermediate its ends the frame is supported by a transversely spaced pair of pneumatic-tired ground engaging wheels 5, each of which is on a separate crank axle 6. The crank axles 6 include laterally inwardly extending shafts 7 journaled, as at 8, on said beams 2, and carried, at adjacent ends, in a bearing sleeve 9 fixed in connection with said main frame. By employing separate crank axles 6 as the mounting for the wheels 5, the latter can be differentially vertically adjusted, and such adjustment is accomplished as follows:

A fluid pressure actuated power cylinder 10 is disposed in longitudinally extending relation centrally on the main frame 1, and is supported from the latter by a clamping collar 11 fixed on the upper edge of an upstanding web 12, which is in turn supported from a longitudinal center beam 35 of the frame 1. The fluid pressure actuated power cylinder 10 is of double-acting type and is disposed in forwardly facing relation, i. e. with the piston rod 13 of said cylinder projecting forwardly, as shown. The double-acting power cylinder 10 is controlled from the tractor to which the power lift is adapted to be connected by the drawbar unit 4, through the medium of a fluid pressure system, shown in part at 14. Said fluid pressure system includes control valve means mounted on the tractor for manipulation by the tractor operator, so that the cylinder 10, in either direction of movement, is under the selective control of said operator. At its forward end the piston rod 13 is fitted with a cross head 15 on which a relatively longer cross bar 16 is pivoted centrally of its ends, as at 17, for swinging movement in a horizontal plane.

At opposite ends the cross bar 16 slidably engages in longitudinal slots 18 in horizontal, longitudinally extending guides 19 fixed on a superstructure 20 on the main frame 1 adjacent the forward end of the latter. A pair of links 21 are disposed on opposite sides of the power cylinder 10 and pivotally connect, as at 22, with the cross bar 16 between the cross head 15 and guides 19. At their rear ends said links 21 pivotally connect, as at 23, with the upper ends of rigid levers 24 which are fixed on and upstand from corresponding ones of the shafts 7 of corresponding axles 6.

The guides 19 are formed with a longitudinal row of holes 25 adapted to removably receive stop pins 26 therein, selectively.

Figure 2:
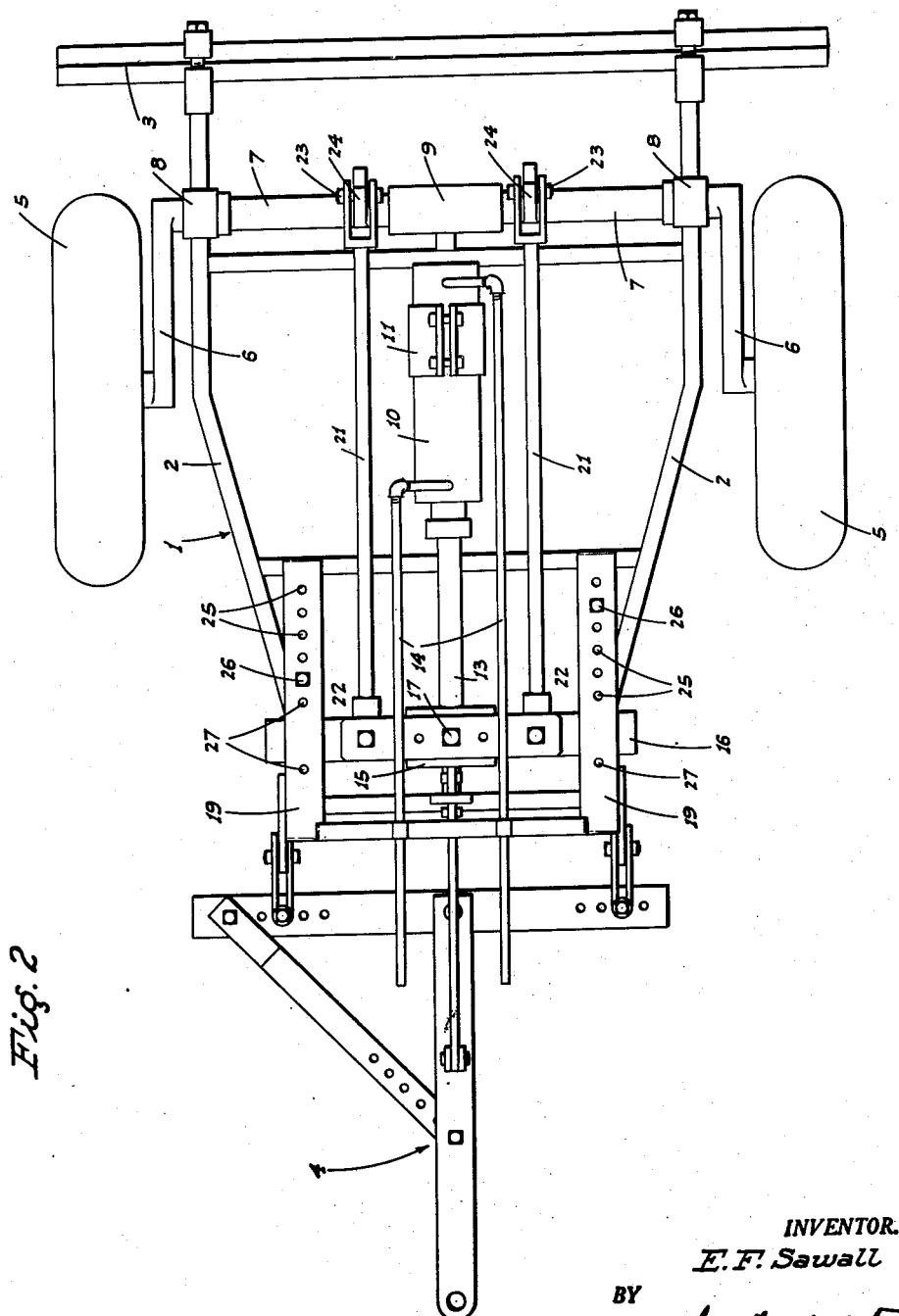
Fig. 2 is a plan view of the implement showing the positions of the several parts when the wheels are relatively lowered and in transverse alinement, with the frame in raised position, as for making turns or transport.

When the power cylinder 10 is actuated to advance the piston rod 13, and the cross bar 16, as shown in Fig. 2, the crank axles 6 are swung downwardly through the medium of the links 21 and levers 24 until the frame 1 is raised to transport position; the wheels 5 then being in transverse alinement.

In order to relieve the power cylinder 10, during transport of the power lift with the wheels 5 in lowered position, the guides 19 include, in the rows of holes 25, certain holes, indicated particularly at 27, through which stop pins may be inserted, so as to thereafter prevent motion of the cross bar 16 in said guides 19.

When the power lift is in use in the field, the stop pins are removed from the holes 27 and one of said pins is placed in a selected hole in the row of holes 25 in each guide 19; such stop pins being positioned with one ahead of the other lengthwise of the direction of travel, as shown in Fig. 2. Thereafter, to lower the main frame 1 and the tool bar 3 so that tools or implements suspended from the latter are moved into ground engagement, the power cylinder 10 is actuated to retract the piston rod 13. This retracts the cross bar 16, and a soon as it engages the most advanced one of the stop pins 26, substantial movement of the link 21 on that side is stopped and upward movement of the corresponding wheel 5 is halted. However, as the piston rod 13 retracts further the cross bar 16 continues to swing rearwardly until its opposite end strikes the other cross pin 26, at which time the cross bar 16 occupies a position as is shown in Fig. 3. Such continued movement of the cross bar 16 thrusts the other link 21 rearwardly to a further extent, whereby the wheel 5 on the same side is relatively raised a greater distance than the wheel whose movement was first stopped.

As a consequence the wheels 5 then occupy vertically offset positions relative to each other, which is desirable when one wheel runs in a plow furrow.

By reason of such differential adjustment of the wheels 5, the main frame 1, together with the tool bar 3, and implements suspended from the latter, may be maintained level when in working position, even though one of the wheels, i. e. the lowermost one, is running in a plow furrow. The extent of differential adjustment which may be accomplished can be altered by varying the relative staggered positions of the stop pins 26 in the rows of holes 25 in the guides 19.

The above described power lift, while being of simple and rugged construction, is effective to set the implement to the desired working depth, while maintaining the implement level as it progresses along the ground. The arrangement is such that the tool bar 3 can be lowered to a point quite close to the ground, which is advantageous. Further, the design of the power lift is such that the frame 1 and the supported implement may be raised or lowered, whether standing still or moving.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention as defined by the appended claims.

Having thus described the invention, the following is claimed as new and useful and upon which Letters Patent are desired:

1. A power lift comprising a frame adapted to mount an implement thereon, a transversely spaced pair of wheels, separate means mounting the wheels on the frame for independent vertical adjustment, a power unit on the frame, said power unit including a longitudinally movable member, a cross bar pivoted intermediate its ends on a vertical axis on said longitudinally movable member for horizontal swinging movement, separate actuating elements connected between the cross bar on opposite sides of said member and corresponding ones of the separate wheel mounting means, and vertically disposed stop means positioned to be engaged by the horizontally swinging cross bar at transversely spaced points offset lengthwise on the frame whereby to halt movement of one of said actuating elements in one direction in advance of the other.

2. A power lift comprising a frame adapted to mount an implement thereon, a transversely spaced pair of wheels, separate means mounting the wheels on the frame for independent vertical adjustment, a power unit on the frame, said power unit including a longitudinally movable member, a cross bar pivoted intermediate its ends on said longitudinally movable member, separate actuating elements connected between the cross bar on opposite sides of said member and corresponding ones of the separate wheel mounting means, and stop means positioned to engage the cross bar at transversely spaced points offset lengthwise on the frame whereby to halt movement of one of said actuating elements in one direction in advance of the other; the offset of said stop means being selectively adjustable.

3. A power lift comprising a frame adapted to mount an implement thereon, a transversely spaced pair of wheels, separate means mounting the wheels on the frame for independent vertical adjustment, a power unit on the frame, said power unit including a longitudinally movable member, a cross bar pivoted intermediate its ends on said longitudinally movable member, separate actuating elements connected between the cross bar on opposite sides of said member and corresponding ones of the separate wheel mounting means, and stop means positioned to engage the cross bar at transversely spaced points offset lengthwise on the frame whereby to halt movement of one of said actuating elements in one direction in advance of the other; the cross bar slidably engaging at opposite ends with guides mounted on the frame, the stop means being mounted on said guides for selective adjustment therealong.

4. A power lift comprising a main frame adapted to mount an implement thereon, a transversely spaced pair of wheels, means mounting the wheels on the frame for independent vertical adjustment, a power cylinder mounted on the frame lengthwise thereof, said power cylinder including a piston rod, a cross bar pivoted intermediate its ends on the piston rod, separate links connecting between the cross bar on opposite sides of the power cylinder and corresponding ones of the separate wheel mounting means, transversely spaced guides mounted on the frame and engaged by opposite ends of the cross bar, and stop means positioned to engage the cross bar at transversely spaced points offset lengthwise on the frame.

5. A power lift comprising a main frame adapted to mount an implement thereon, a transversely spaced pair of wheels, means mounting the wheels on the frame for independent vertical adjustment, a power cylinder mounted on the frame lengthwise thereof, said power cylinder including a piston rod, a cross bar pivoted intermediate its ends on the piston rod, separate links connecting between the cross bar on opposite sides of the power cylinder and corresponding ones of the separate wheel mounting means, transversely spaced guides mounted on the frame and engaged by opposite ends of the cross bar, and stop means positioned to engage the cross bar at transversely spaced points offset lengthwise on the frame; the guides being slotted, and the ends of the cross bar engaging in the slots.

6. A power lift comprising a main frame adapted to mount an implement thereon, a transversely spaced pair of wheels, means mounting the wheels on the frame for independent vertical adjustment, a power cylinder mounted on the frame lengthwise thereof, said power cylinder including a piston rod, a cross bar pivoted intermediate its ends on the piston rod, separate links connecting between the cross bar on opposite sides of the power cylinder and corresponding ones of the separate wheel mounting means, transversely spaced, longitudinally slotted guides mounted on the frame, opposite end portions of the cross bar slidably engaging in the slots of corresponding guides, and stop pins mounted on the guides in longitudinally adjustable relation thereon and projecting into the slots.

7. A power lift comprising a main frame adapted to mount an implement thereon, a transversely spaced pair of wheels, separate crank axles mounting the wheels on the frame for independent vertical adjustment, said crank axles including laterally inwardly extending shafts, a power cylinder mounted on the frame lengthwise thereof, said power cylinder including a piston rod, a cross bar pivoted intermediate its ends on the piston rod, radial levers on said shafts disposed to opposite sides of said cylinder, links pivotally connected between said levers and the cross bar on opposite sides of the pivot of the latter, transversely spaced, longitudinally slotted guides mounted on the frame, opposite end portions of the cross bar slidably engaging in the slots of corresponding guides, and stop pins mounted on the guides in longitudinal adjustable relation thereon and projecting into the slots.

ERVIN F. SAWALL.

REFERENCES CITED

The following references are of record in the file of this patent:

UNITED STATES PATENTS

| Number | Name | Date |
|---|---|---|
| 1,353,393 | Haupt | Sept. 21, 1920 |
| 1,877,520 | MacGregor | Sept. 13, 1932 |
| 2,195,631 | Post et al. | Apr. 2, 1940 |